US010026141B2

(12) United States Patent
Tsai (10) Patent No.: US 10,026,141 B2
(45) Date of Patent: Jul. 17, 2018

(54) VISUAL INTERFACE APPARATUS AND DATA TRANSMISSION SYSTEM

(71) Applicant: Hsiung-Kuang Tsai, Taipei (TW)

(72) Inventor: Hsiung-Kuang Tsai, Taipei (TW)

(73) Assignee: SLIM HMI TECHNOLOGY, Taipei (TW)

( * ) Notice: Subject to any disclaimer, the term of this patent is extended or adjusted under 35 U.S.C. 154(b) by 27 days.

(21) Appl. No.: 14/386,680

(22) PCT Filed: Jan. 22, 2013

(86) PCT No.: PCT/CN2013/070816
§ 371 (c)(1),
(2) Date: Sep. 19, 2014

(87) PCT Pub. No.: WO2013/139183
PCT Pub. Date: Sep. 26, 2013

(65) Prior Publication Data
US 2015/0070248 A1  Mar. 12, 2015

(30) Foreign Application Priority Data
Mar. 21, 2012  (WO) ............... PCT/CN2012/072670

(51) Int. Cl.
*G06F 3/14* (2006.01)
*G06T 1/20* (2006.01)
(Continued)

(52) U.S. Cl.
CPC ............. *G06T 1/20* (2013.01); *G06F 3/044* (2013.01); *G06F 3/046* (2013.01); *G06F 3/0412* (2013.01);
(Continued)

(58) Field of Classification Search
CPC .............. G09G 9/00; G06F 3/14; G06F 3/147
See application file for complete search history.

(56) References Cited

U.S. PATENT DOCUMENTS

2006/0192794 A1* 8/2006 Larson ................... G09G 5/006
345/698
2009/0021494 A1  1/2009 Marggraff et al.
(Continued)

FOREIGN PATENT DOCUMENTS

| CN | 1670787 A | 9/2005 |
|---|---|---|
| CN | 1716018 A | 1/2006 |

(Continued)

*Primary Examiner* — Dennis Joseph
(74) *Attorney, Agent, or Firm* — Muncy, Geissler, Olds & Lowe, P.C.

(57) ABSTRACT

A visual interface apparatus cooperates with an operation apparatus and has a display surface. The visual interface apparatus comprises a display panel and a control unit. The display panel includes an array substrate and a display medium. The control unit transmits a display data and a transmission data to the display panel. When the operation apparatus is operated on the display surface, a coupling signal containing the transmission data is coupled to the operation apparatus from at least one electrode of the display panel, and the operation apparatus receives the coupling signal to obtain a coupling data. A data transmission system is also disclosed in the invention. Thereby, not only the visual interface apparatus can display images, but also the transmission data such as data or files can be transmitted to another electronic apparatus through the visual interface apparatus. Therefore, it can be applied to multiple near range wireless communication situations, and the application of the display apparatus can be extended.

18 Claims, 4 Drawing Sheets

(51) Int. Cl.

| | |
|---|---|
| *G09F 9/00* | (2006.01) |
| *G09G 5/18* | (2006.01) |
| *G06F 3/147* | (2006.01) |
| *G09G 5/12* | (2006.01) |
| *G09G 3/20* | (2006.01) |
| *G06F 3/041* | (2006.01) |
| *G06F 3/044* | (2006.01) |
| *G06F 3/046* | (2006.01) |
| *G09G 3/04* | (2006.01) |
| *G09G 3/3225* | (2016.01) |
| *G09G 3/36* | (2006.01) |

(52) U.S. Cl.
CPC .............. *G06F 3/147* (2013.01); *G09F 9/00* (2013.01); *G09G 3/20* (2013.01); *G09G 5/12* (2013.01); *G09G 5/18* (2013.01); *G09G 3/04* (2013.01); *G09G 3/3225* (2013.01); *G09G 3/3648* (2013.01); *G09G 2354/00* (2013.01); *G09G 2370/06* (2013.01); *G09G 2370/16* (2013.01)

(56) References Cited

U.S. PATENT DOCUMENTS

| | | | |
|---|---|---|---|
| 2011/0037863 A1* | 2/2011 | Mihota | G03B 17/00 |
| | | | 348/208.99 |
| 2011/0193798 A1 | 8/2011 | Zhan et al. | |
| 2011/0294433 A1* | 12/2011 | Matsubara | H04M 1/7253 |
| | | | 455/41.3 |
| 2013/0059532 A1* | 3/2013 | Mahanfar | H04B 5/0031 |
| | | | 455/41.1 |

FOREIGN PATENT DOCUMENTS

| | | |
|---|---|---|
| CN | 1716018 A | 1/2006 |
| CN | 101017419 A | 8/2007 |
| CN | 101452521 A | 6/2009 |
| CN | 101470998 A | 7/2009 |
| CN | 102013901 A | 4/2011 |
| EP | 2172834 A2 | 4/2010 |
| EP | 2 391 104 A2 | 11/2011 |
| JP | 07-020421 A | 1/1995 |
| JP | 07-046515 A | 2/1995 |
| JP | 2006-053234 A | 2/2006 |
| JP | 2008-123222 A | 5/2008 |
| JP | 2011-248768 A | 12/2011 |
| TW | M391242 U1 | 10/2010 |

* cited by examiner

VISUAL INTERFACE APPARATUS AND DATA TRANSMISSION SYSTEM

BACKGROUND OF THE INVENTION

Field of Invention

The invention relates to a visual interface apparatus and a data transmission system configured with a near field communication function.

Related Art

In recent years, for expanding the application of the consumer electronic products, people start to introduce the near field communication (or short range wireless communication) technology into the electronic products. The near field communication (or short range wireless communication) technology can provide the transmission of such as commands, music, pictures, business cards, data or files from an electronic apparatus to another electronic apparatus without establishing a physical circuit connection. This not only provides a convenient way of data transmission for the electronic apparatus but also expand the applications, for example, to replace the occasions requiring IC cards, such as access control, tickets, credit cards. Or in the occasion of receiving advertising information, such like using Bluetooth to receive the coupon from the screen in the market.

It is an expectable trend for the electronic product to equip with near field communication function. Therefore, it is an important subject to develop a new architecture for electronic apparatus such that they can possess a function similar to the near field communication and also the communication architecture based on these electronic apparatus. On the other hand, the functions of an electronic apparatus originate from each functional assembly and traditionally, each functional assembly just provides a single function or integrates similar functions together. Nevertheless, the product trends towards light weight, thin thickness, and lower price and the integration cross different functional assemblies becomes inevitable, especially, the display module which influences the product appearance and cost significantly. If the function of a display module can be extended from a single function to multiple functions, it will impact the product ecosystem substantially.

SUMMARY OF THE INVENTION

Based on the above consideration, the objective of the invention is to set up a data transmission system on the visual interface apparatus. The data transmission system can integrate the data for two different purposes, process the display data and the transmission data, and then send them to the display panel of the visual interface apparatus. Thus, the system not only utilizes the visual interface apparatus to display images, but also to transmit the transmission data, such as data or files, to another electronic apparatus. Therefore, it can be applied to various situations of short range wireless communication, and also the first time to integrate two totally different functions into a single assembly. Thus, the complexity of integrating different functional assemblies in an electronic apparatus can be reduced and the product can be lighter and thinner. Besides, by integrating different functions into a single assembly, the cost can be reduced and thus can pursuit for more applications of a display apparatus.

The invention can be accomplished by the following techniques.

A visual interface apparatus of this invention cooperates with an operation apparatus and has a display surface. The visual interface apparatus comprises a display panel and a control unit. The display panel includes an array substrate and a display medium. The control unit integrates a display data and a transmission data into a single data stream and transmits the data stream to the display panel. When the operation apparatus is operated on the display surface, a coupling signal containing the transmission data is coupled to the operation apparatus from at least one electrode on the display panel, and the operation apparatus receives the coupling signal to obtain a coupling data.

In one embodiment, the electrode coupling the transmission data is a separate electrode outside the display viewing area of the array substrate or the electrode inside the display viewing area of the array substrate.

In one embodiment, the display panel is a two-dimensional active array display panel, a two-dimensional passive array display panel, a two-dimensional dot array display panel or a one-dimensional dot array display panel.

In one embodiment, the array substrate includes a substrate and a pixel array, the pixel array is disposed on the substrate, and the display surface and the pixel array are disposed on the same side or opposite sides of the substrate.

In one embodiment, the content of the transmission data or coupling data includes a touch message, command message, identification message, trade message, file message, body physiological message, or size message of the operation apparatus.

In one embodiment, the coupling data is transmitted to the visual interface apparatus or a receiving apparatus through the operation apparatus, In one embodiment, the receiving apparatus obtains a receiving data according to the coupling data.

In one embodiment, the operation apparatus or the receiving apparatus generates a response signal according to the coupling data and transmits the response signal to the visual interface apparatus.

In one embodiment, the control unit adds a label in the display data or adds another label in the transmission data, and the operation apparatus or the receiving apparatus identifies the display data and the transmission data according to the label or the another label.

A data transmission system of this invention comprises an operation apparatus and a visual interface apparatus. The visual interface apparatus includes a display surface, a display panel and a control unit. The display panel includes an array substrate and a display medium and the control unit integrates a display data and a transmission data into a single data stream and transmits the data stream to the display panel. When the operation apparatus is operated on the display surface, a coupling signal containing the transmission data is coupled to the operation apparatus from at least one electrode on the display panel, and the operation apparatus receives the coupling signal to obtain a coupling data.

In one embodiment, the electrode coupling the transmission data is a separate electrode outside the display viewing area of the array substrate or an electrode inside the display viewing area of the array substrate.

In one embodiment, the display panel is a two-dimensional active array display panel, a two-dimensional passive array display panel, a two-dimensional dot array display panel or a one-dimensional dot array display panel.

In one embodiment, the array substrate includes a substrate and a pixel array, the pixel array is disposed on the substrate, and the display surface and the pixel array are disposed on the same side or opposite sides of the substrate.

In one embodiment, the content of the transmission data or coupling data includes a touch message, command message, identification message, trade message, file message, body physiological message or size information.

In one embodiment, the data transmission system further comprises a receiving apparatus. The coupling data is transmitted to the visual interface apparatus and/or the receiving apparatus through the operation apparatus.

In one embodiment, the receiving apparatus obtains a receiving data according to the coupling data.

In one embodiment, the operation apparatus or the receiving apparatus generates a response signal according to the coupling data and transmits the response signal to the visual interface apparatus.

In one embodiment, the control unit adds a label in the display data or adds another label in the transmission data, and the operation apparatus or the receiving apparatus identifies the display data and the transmission data according to the label or the another label.

As mentioned above, in the visual interface apparatus and the data transmission system of this invention, when the operation apparatus is operated on the display surface of the visual interface apparatus, the coupling signal containing the transmission data is coupled to the operation apparatus from at least one electrode on the display panel, and the operation apparatus can obtain a coupling data after receiving the coupling signal. Thereby, not only the visual interface apparatus can display images, but also the transmission data such as data or files can be transmitted to another electronic apparatus through the visual interface apparatus. Therefore, it can be applied to multiple near range wireless communication situations, and the application of the display apparatus can be extended.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

In the following, a preferred embodiment of a visual interface apparatus and a data transmission system of the present invention will be described with reference to the accompanying drawings, wherein the same references relates to the same elements.

Figure 1:
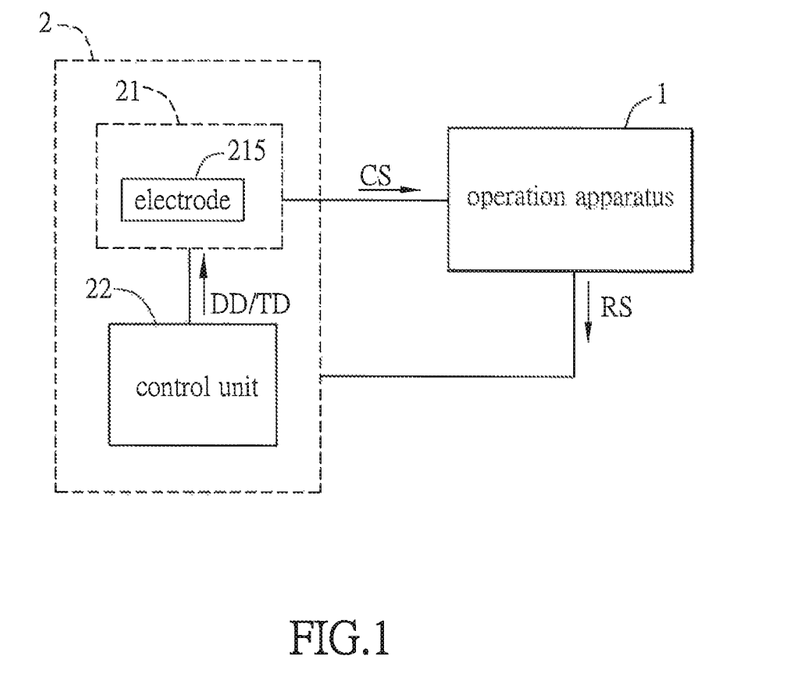
FIG. 1 is a schematic functional block diagram of a data transmission system according to a preferred embodiment of the invention.

FIG. 1 is a schematic functional block diagram of a data transmission system according to a preferred embodiment of the invention.

As shown in FIG. 1, the data transmission system includes an operation apparatus 1 and a visual interface apparatus 2. The operation apparatus 1 and the visual interface apparatus 2 are coupled with each other, for example, by electromagnetic coupling (such as capacitance or inductance), and thereby the data or files can be transmitted. So, it's a kind of data or file transmission without a wired connection, and it can be thus called a wireless transmission of data or files. The data transmission system can be an electronic system, such as a touch system, an interactive advertisement system, a market promotion ordering system, an access control identification system, a message inquiry system, an automatic teller machine system, a portable mobile apparatus or another system involving near range data transmission. Herein, the so-called near range is within 10 cm for example.

The operation apparatus 1 can be, for example, a receiving device, such as a card reader or a gate control system, a stylus, an IC card, a cell phone, a user (especially when the signal is coupled to another apparatus through the user's hand), a public message apparatus, a point of sales (POS) apparatus, another electronic apparatus having a visual interface display, or an electronic apparatus capable of executing other functions. When the operation apparatus 1 is a user, the signal can be transmitted to another apparatus through the user's body. The visual interface apparatus 2 can be, for example, another cell phone, a computer (such as tablet computer, notebook computer), another public display, an advertisement board, an electronic whiteboard or a personal digital assistant (PDA), or their any combination. Moreover, the operation apparatus 1 and the visual interface apparatus 2 both can include functional sub-systems, such as processor, storage system or transmission system. Herein, the said system can be constructed by hardware, software, firmware or their any combination.

The data transmission system of the invention also can include a recording medium (not shown), which can stores a plurality of commands, and the commands can be executed by the visual interface apparatus 2. The recording medium can be, for example, a memory, a memory card, an optical disc, a video tape, a computer magnetic tape, or their any combination, for storing procedures or commands. The memory can include a ROM, a RAM, a Flash memory, a field-programmable gate array (FPGA), or other types of memory. The recording medium can be an internal component of the visual interface apparatus 2 (such as the memory inside the visual interface apparatus 2 but separate from the control unit 22, or an internal memory of the control unit 22), or an isolated appliance, separate from the visual interface apparatus 2 (such as a cloud data center), which is connected with the visual interface apparatus 2 through a wired (e.g. local area network), wireless (e.g. Wi-Fi, Bluetooth or radio frequency) or other physical or non-physical connection.

Figure 2A:
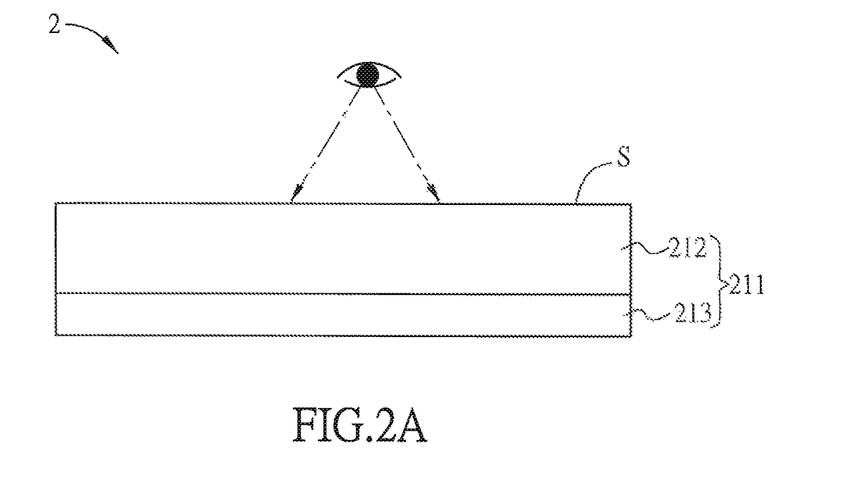
FIGS. 2A and 2B are schematic side-view diagrams of variations of a visual interface apparatuses of a preferred embodiment of the invention.

Refers to FIG. 1 and FIG. 2A. FIG. 2A is a schematic side-view diagram of a visual interface apparatus 2 of a preferred embodiment of the invention.

The visual interface apparatus 2 has a display surface S and also includes a display panel 21 and a control unit 22. The display panel 21 can be a two-dimensional active array display panel, a two-dimensional passive array display panel, a two-dimensional dot array display panel or a one-dimensional dot array display panel, and this invention is not limited thereto. As shown in FIG. 2A, the display panel 21 includes an array substrate 211 and a display medium (not shown). By taking an LCD display apparatus as an example, the display medium is liquid crystal for example. By taking an OLED display apparatus as an example, the display medium is the OLED light-emitting layer. Moreover, the array substrate 211 includes the electrodes of a part of the display panel 21, and can be a one-dimensional electrode array substrate or a two-dimensional electrode array substrate. By taking an active LCD apparatus as an example, the array substrate 211 can be the single-electrode one-dimensional array substrate (the color filter substrate) including a common electrode or the two-dimensional array substrate including h thin-film transistor (TFT) pixel electrode. By taking a passive LCD apparatus as an example, the array substrate 211 can be the one-dimensional array substrate including the electrode disposed on any side of the pixel. By taking an electrophoretic dot array display panel as an example, the array substrate 211 can be the single-electrode one-dimensional array substrate including the common electrode or the one-dimensional or two-dimensional array substrate including the pixel electrode. By taking a single pixel for indicating the state of a touch switch as an example, the array substrate 211 can be the one-dimensional array substrate including the electrode forming the pixel on any side.

Figure 2B:
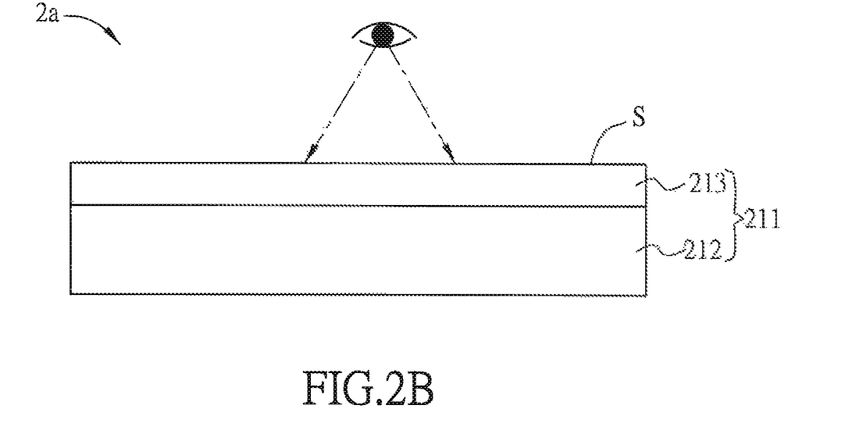

Herein, the array substrate 211 includes a substrate 212 and a pixel array 213 (as mentioned above, which can be two dimensions or multiple electrodes in one dimension (such as a seven-segment display screen, an electronic label), or a single electrode (such as the indicator of a touch switch)). In this embodiment, the pixel array 213 is disposed on a side of the substrate 212 and the display surface S is disposed on the other side of the substrate 212 (which means the array substrate 211 is reversely disposed). The display surface S is the surface, which is the closest to the user, of the visual interface apparatus 2a when the user watches the images displayed by the visual interface apparatus 2. However, in other embodiments, such as shown in FIG. 2B, the display surface S and the pixel array 213 of the visual interface apparatus 2a can be disposed on the same side of the substrate 212, and this invention is not limited thereto. Besides, the side, which is closer to the user, of the substrate 212 also can include other components, such as a polarizer, a protection glass or a housing.

As shown in FIGS. 1 and 2A, the display panel 21 includes at least one electrode 215. Herein, the display panel 21 is an active matrix for example, and can be an LCD panel, OLED panel, LED panel, electrophoretic display panel, or MEMS display panel. By taking an LCD panel as an example, the display panel 21 can include a plurality of column electrodes, a plurality of row electrodes and a plurality of pixel electrodes (not shown) to form the pixel array 213, and the column electrodes and the row electrodes can cross each other. Moreover, the display panel 21 can further include a plurality of transistors (not shown), which are electrically connected with the column electrodes, the row electrodes and the pixel electrodes. Herein, the row electrodes can be a plurality of scan lines and the column electrodes can be a plurality of data lines. Of course, the row electrodes can be a plurality of data lines and the column electrodes can be a plurality of scan lines. Moreover, the electrode 215 can be a separate electrode outside the display viewing area of the array substrate 211 or an electrode inside the display viewing area of the array substrate 211. In other words, the electrode 215 can be at least one of the column or row electrodes of the pixel array 213 of the display panel 21 or an electrode (can be one or multiple electrodes) separate from and outside the pixel array 213, and this invention is not limited thereto. Moreover, the shape of the electrode 215 can be a dot, a line or a spiral or other shapes that can be arranged in one or two dimensions, and this invention is not limited thereto. To be noted, the electrode 215, used in the data transmission, is required to be disposed close to the user operation surface (i.e. the display surface S).

The control unit 22 includes the key control assembly of the visual interface apparatus 2, and for example, can include at least a central processing unit (CPU) and a memory, or other control hardware, software or firmware. The control unit 22 also includes a driving unit (not shown in FIG. 1), which includes the circuit for driving the display panel 21. By taking an LCD panel as an example, the driving unit for driving the LCD panel can include a timing control circuit (T-con), a data driver and a scan driver. The driving unit can be a single integrated circuit or multiple stand-alone integrated circuits (e.g. driving IC) and electrically connect to the display panel 21. Or the driving unit can be partially stand-alone and partially integrated on the display panel 21, or totally integrated on the display panel 1 (drivers on panel), which is not limited in this invention. Herein, the said "stand-alone" or "integrated" means whether the driving unit and the display panel share the substrate or not. The scan drivers are electrically connected to the scan lines of the display panel 21, and the data drivers are electrically connected to the data lines of the display panel 21. The timing control circuit can convert the scan signal and data signal received from the peripheral interface into the signals for the display panel to display images, and can generate the required frequency and synchronization for the scan driver and the data driver and also the scan signal and data signal required for each pixel.

In order to integrate the display data and the transmission data, the control unit 22 needs to extend its original function so as to integrate a display data DD and a transmission data TD into a single data stream and transmit it to the display panel 21. Herein, the display data DD and the transmission data TD pass through the driving unit to drive the display panel 21. When the operation apparatus 1 approaches or is operated on the display panel 21, the signal can be coupled to the operation apparatus 1. The display data DD and the transmission data TD can be generated by internal or external commands of the visual interface apparatus 2, and their source can be obtained from the memory inside the visual interface apparatus 2 or through the transmission from an external apparatus. This invention is not limited thereto, Besides, in order that the operation apparatus 1 can identify the display data DD and the transmission data TD, the control unit 22 needs to process the display data DD and the transmission data TD first. The processing of the control unit 22 can include, for example, modulation, series-to-parallel conversion, encoding, adding a header (containing data size, checksum code, serial number, tracking data), or other processing. In comparison with the traditional communication transmission mode, the invention can use different electrodes of the display panel 21 as the signal emission sources (multiple communication channels) for implementing the transmission. These communication channels can use spatial separation or modulation techniques to transmit simultaneously and also to reduce the mutual interference. To be noted, the series-to-parallel conversion of the data can be implemented in a sequential or alternate manner or their combination. Herein, the display data DD and the transmission data TD represent two kinds of data for different purposes, which are transmitted to the display panel 21 and they don't stand for the signals. By taking an LCD panel as an example, the display data DD represents, including, the scan signal and the data signal for the image display, and the transmission data TD may represent a signal different from the scan signal or data signal, or a signal same as scan signal in the display data DD, or a signal same as data signal in the display data DD.

By taking the data line as an example, the data line not only can transmit the conventional data signal (display data DD) of a frame image but also can transmit the transmission data TD. The key point of this feature is to establish an operation model such that they can coexist and will not influence each other. On this premise, for example, the transmission data TD can be converted into a signal having a frequency higher than the frequency of the data signal (display data DD) and directly being superposed on the signal of the display data DD, or the signal of the transmission data TD can be transmitted within the interval between the signals of the display data DD. For example, the transmission data TD can be transmitted after completing the scanning of all scan lines in a frame and before starting the scanning of the next frame (the blanking time between the consecutive frames), or after completing the scanning of a certain scan line and before starting the scanning of the next scan line, or, by shortening the time for display data DD, within the scan time of each scan line and before the transmission of the display data DD.

Figure 3:
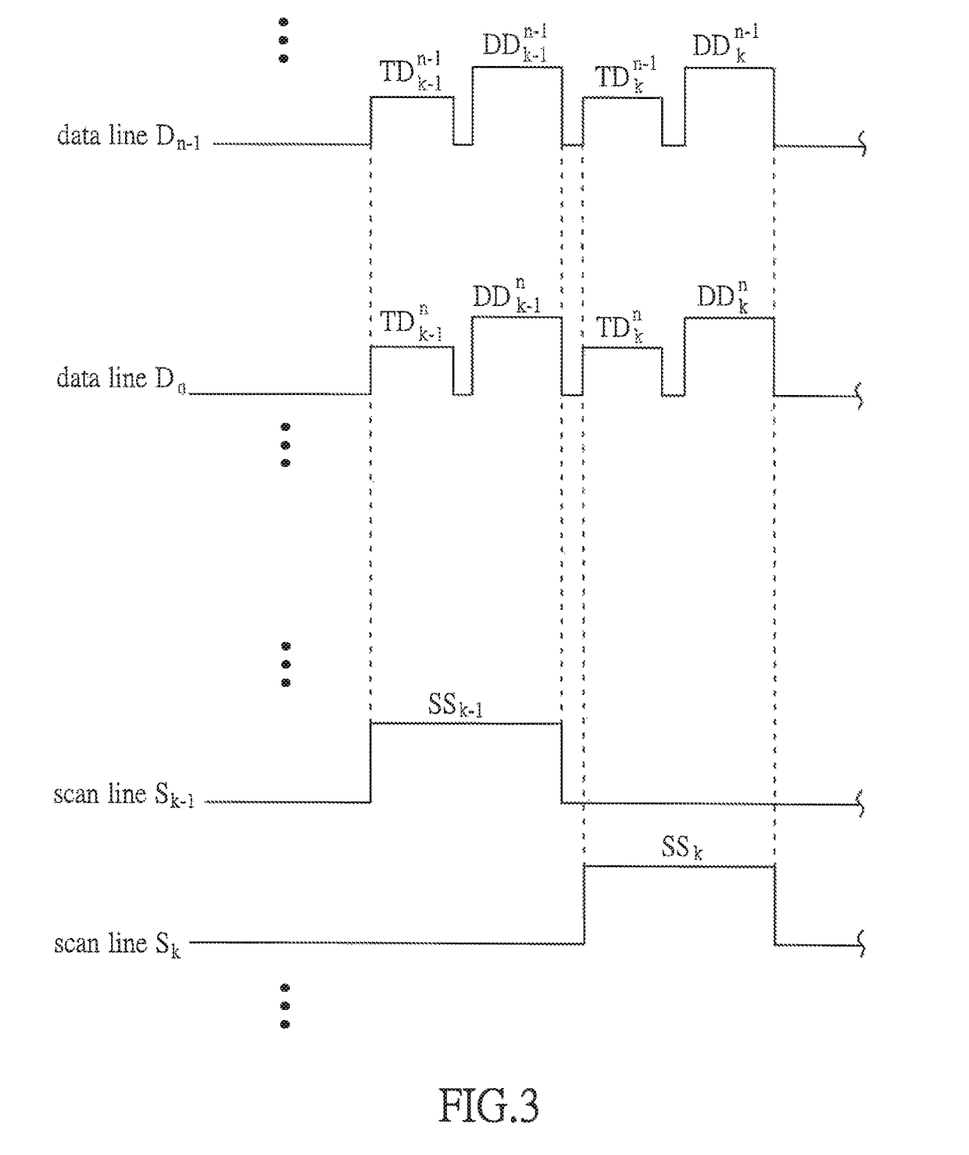
FIG. 3 is a schematic signal diagram of the two adjacent scan lines (row electrodes) and two adjacent data lines (column electrodes) in an LCD panel.

FIG. 3 is a schematic diagram showing the signals of the two adjacent scan lines (row electrodes) and two adjacent data lines (column electrodes) in an LCD panel. Herein, the example is provided that the transmission of the transmission data TD is implemented when each row of the transistors is turned on for the display. To be noted, the transistor is not required to be turned on for transmitting the transmission data TD. The transmission of the transmission data TD can be implemented when the transistors are turned off. The scan lines can transmit the scan signal to sequentially turn on each row of the transistors, and when each row of the transistors is turned on, each of the data lines can transmit the transmission data TD and the display data DD (gray-level data).

In this embodiment, when the scan line $S_{k-1}$ transmits the scan signal $SS_{k-1}$, all data lines transmit the transmission data $TD_{k-1}$ (the transmission data transmitted by the respective data line is expressed as $TD^{n-1}{}_{k-1}$ and $TD^{n}{}_{k-1}$). When the scan line $S_k$ transmits the scan signal $SS_k$, all data lines transmit the transmission data $TD_k$ (the transmission data transmitted by the respective data line is expressed as $TD^{n-1}{}_k$ and $TD^{n}{}_k$). In FIG. 3, the transmission data $TD_{k-1}$, $TD_k$ (expressed as $TD^{n-1}{}_{k-1}$, $TD^{n}{}_{k-1}$, $TD^{n-1}{}_k$, $TD^{n}{}_k$ respectively) are distinguished from the respective display data $DD_{k-1}$, $DD_k$ (expressed as $DD^{n-1}{}_{k-1}$, $DD^{n}{}_{k-1}$, $DD^{n-1}{}_k$, $DD^{n}{}_k$, respectively) by different voltage level, but they may be implemented by the same voltage level or other features in other embodiments. Therefore, when the scan lines transmit the scan signal, the data lines can transmit the transmission data TD. Because the data line is transmitting the display data DD before the scan signal is turned off, the last data entering into the pixel is the display data DD. Therefore, the data line can transmit the transmission data TD without influencing the image display. To be noted, the transmission data $TD^{n-1}{}_{k-1}$, $TD^{n}{}_{k-1}$, $TD^{n-1}{}_k$, $TD^{n}{}_k$ in FIG. 3 is shown as high level of "1", but it's just for the illustrative purpose, and certainly the low level of "0" also can be used. Moreover, in order to avoid the occurrence of the signal polarity issue, the signal of the transmission data $TD^{n-1}{}_{k-1}$, $TD^{n}{}_{k-1}$, $TD^{n-1}{}_k$, $TD^{n}{}_k$ can be formed by AC signals with zero DC component. Besides, here the example is provided by that the transmission data TD is transmitted by the column electrode, the column electrode serves as one electrodes of the capacitive coupling and the operation apparatus 1 has the other electrode of the capacitive coupling. When the operation apparatus 1 is a stylus for example, the tip of the stylus has a conductor acting as the other electrode of the capacitive coupling. The digital "1" or "0" are represented by signals with different amplitude in above, however, frequency also can be used to represent "1" or "0", For example, defines 5 cycles of high-to-low amplitude change within a unit time as "1" and the rest as "0". Otherwise, the phase can be used to express "1" or "0" of the digital signal, which, for example, defines a high level followed by a low level as "0" and a low level followed by a high level as "1". The type of the modulation technique is not limited herein. Moreover, in order to avoid the interference between the adjacent electrodes, the time-division multiplexing, frequency-division multiplexing, or code-division multiplexing can he used for the different electrodes.

The transmission data TD also can be transmitted through the scan line, for example, the transmission data TD is converted into the signal having the levels incapable of turning on the pixel transistor; or the transmission data TD is transmitted through an electrode (e.g. a separate electrode) not belonging to the data lines can lines; or the transmission data TD is transmitted through the data line and the scan line simultaneously for increasing the transmission rate; or the transmission data TD is converted into two signals (e.g. one positive and the other negative) and then sent to different electrodes (e.g. the data lines or the scan lines) for reducing the signal amplitude. The timing of the display panel 21 can be arranged in a time-division architecture in order to implement both the display and transmission functions. For example, if the transmission data TD is to be transmitted by the column electrode or the row electrode of the pixel array, it can be arranged to transmit at different time from the display data DD of the visual interface apparatus 2, such as after the transmission of a frame or before the transmission of a frame. In other words, the visual interface apparatus 2 can start to transmit the coupling signal CS to the operation apparatus 1 after the end of a frame and before the start of the next frame, or within the period of a frame. The transmission data TD can be designed to transmit in a regular mode, which means, for example, regularly transmit a certain length of the transmission data TD after the transmission of the display data DD in each frame (that is, fixed lengths of time are assigned to the display data DD and the transmission data TD respectively within a frame. In other words, the frame rate is fixed). However, the frame rate also can be dynamically adjusted according to the requests (that is the variable frame rate), and the transmission data TD is arranged to transmit in one period of time (burst) or distributed in different frames. Moreover, when the transmission data TD is transmitted by the data line for example, the transmission of the transmission data TD need not be limited by the timing constraints of the display data DD, for example, the data is just changed once within a scan line period. In other words, the data switching period of a data line can be much shorter than the scan line period when transmits the transmission data TD to achieve a higher transmission rate. To be noted, if the transmission data TD is transmitted by a separate electrode outside the pixel array; it will not need to work coordinately with the timing of display frame.

As shown in FIG. 1, when the operation apparatus 1 is operated on the display surface of the visual interface apparatus 2, the coupling signal CS containing the transmission data TD can he coupled (e.g. capacitive or inductive coupling) to the operation apparatus 1 through at least one electrode 215 on the display panel 21, and the operation apparatus 1 receives and processes the coupling signal CS to obtain a coupling data (which can be the same as or different from the transmission data TD). After obtaining the coupling data, the operation apparatus 1 can transmit the coupling data to the visual interface apparatus 2, another relay apparatus or a receiving apparatus outside the data transmission system in the manner of wire, wireless, electrical coupling (including capacitive coupling) or optical coupling. The transmission data TD or the coupling data obtained by the operation apparatus 1 can be a digital data stream or digital file stream, and the content thereof can include a touch information (including touch position, coordinates or displacement), command information, identification information, trading information, file information, body physiological information, size information of the operation apparatus 1 (including the size or dimension of operation apparatus 1 contacting the display surface 5, such as the area and position of a finger contacting the display surface S.) or other kinds of information. After the operation apparatus 1 receives the coupling signal CS, an extraction (not shown) of the operation apparatus 1 can extract the coupling data from the coupling signal CS to complete the data or file transmission. Herein, the coupling is that the digital message (i.e. 0 or 1) is transmitted to the operation apparatus 1 from the visual interface apparatus 2 in a short range and wireless manner. When the operation apparatus 1 receives the coupling signal CS from the display panel 21, the extraction unit of the operation apparatus 1 can process the coupling signal CS to obtain the transmitted message.

Take the application in touch as an example. The coupling signal CS contains information related to the coordinates of the display screen of the visual interface apparatus 2. The coupling, in a wireless manner, will utilize the short range (Near Field) signal transmission formed by the touch action. Moreover, the processing of the operation apparatus 1 can include the amplification and/or decoding of the coupling signal CS to identify which row electrode is touched, the touch position, the touch gesture (stylus gesture) or the command function corresponding to the touch action. Of course, in other applications, the coupling signal CS can be formed by any desired transmission information, such as command information, identification information, trading information, file information (music, pictures, characters, etc.) or other information, so that the coupling data contains the corresponding information. When this invention is applied to other non-touch situations, the message to be transmitted is first encoded into the coupling signal CS according to a particular rule and the coupling signal CS is then capacitively coupled to the operation apparatus 1 (such as a wall mount short range wireless reader) from the display panel 21 (such as included in the cell phone or tablet computer). Likewise, the extraction unit of the operation apparatus 1 can process the coupling signal CS according to the preset rule (such as decoding and/or modifying the data) to obtain the coupling data and then use the coupling data according to the defined purpose, such as access control, shopping or financial trading, file transmission.

Since the display data DD and the transmission data TD are both coupled to the operation apparatus 1 through the electrode 215, in order that the operation apparatus 1 can extract the coupling data from the coupling signal CS, the control unit 22 can add at least one label to the display data DD and/or the transmission data TD. Therefore, the coupling signal CS contains the label so that the operation apparatus 1 can identify the desired transmission data to extract. In other words, the control unit 22 can just add a label to the display data DD so that the operation apparatus 1 can identify the display data DD; or the control unit 22 can add a label to the transmission data TD so that the operation apparatus 1 can identify the transmission data TD; or the control unit 22 can add different labels to the display data DD and the transmission data TD so that the operation apparatus 1 can identify the display data DD and the transmission data TD according to the different labels to obtain the coupling data. Herein, the label added by the control unit 22 can contain at least a transmission label or at least a data label (either transmission label or data label). The transmission label means that the display data DD and the transmission data TD are processed in different modulation manners, such as the transmission data TD transmitted in a frequency, amplitude or phase that is different from the display data DD. The data label means that a special label is added in the data to mark, for example, the beginning position, ending position or data length of the transmission data TD so that the operation apparatus 1 can identify which portion of the coupling signal CS is the display data DD for the display and which portion of the coupling signal CS is the transmission data TD for the transmission. The data label can mark, for example, the beginning position, ending position (if the data length is fixed, only the beginning position needs to be known) or data length of the display data DD, or the beginning position, ending position (if the data length is fixed, only the beginning position needs to be known) or data length of the transmission data TD. Moreover, the label also can include at least one of the identification information (such as brand, serial number, name) of the visual interface apparatus 2, the identification information of the operation apparatus 1, or an error correction code, or their any combination (the error correction code can be a check sum for example, which can be used to check whether the data is damaged during the transmission and can request for retransmission if the error occurs). Thus, the operation apparatus 1 can obtain the coupling data according to the label.

For example, the data transmission system can use different frequencies (such as modulating the transmission data TD by the frequency that is four times the scan line frequency of the display data DD), amplitudes, phases (such as the display data DD has polarity inversion but the transmission data TD maintains the polarity in consecutive frames) to transmit the display data DD and the transmission data TD, so that the operation apparatus 1 can capture the coupling data accordingly. The above-mentioned refers to the transmission label manner (label embedded in the transmission manner). Or, a particular amplitude, frequency, frequency width or code occurring within a period of time is used to identify the position of the transmission data TD or display data DD, and for example, using an extra-large amplitude signal to stand for the beginning position of the display data DD or transmission data TD (or a synchronization signal) so that the operation apparatus 1 can identify and extract the data. The operation apparatus 1 also can identify and extract the transmission data TD from the level of amplitude, frequency-domain signal (for example, whether a particular frequency signal different from the display data DD occurs or not), time-domain region (for example, when the transmission data TD is transmitted after the display data DD at each frame or between the scan lines), data width (for example, the data width of the transmission data TD is half of the scan time of the display data DD), or particular codes such as, the beginning point of the transmission data TD is a digital data of [010], and each data width is ⅓ scan time). The above-mentioned refers to the data label (label embedded in the transmitted data). To be noted, in addition to the label used to identify the display data DD and the transmission data TD, the label of the invention also can include a recipient, a sender, data length, or error correction code for helping the discrimination or identification of the transmission data TD and its correctness thereof.

The operation apparatus 1 can generate a response signal RS according to the coupling data and transmit it to the visual interface apparatus 2 or other receiving apparatuses. The response signal RS can be a message to inform the visual interface apparatus 2 about the receiving state of the operation apparatus 1, or a message to acknowledge that the operation apparatus 1 is ready to receive the signal, or a synchronization signal, confirmation signal (such as recognizing the identification) or trade confirmation signal (such as the traded product) between the operation apparatus 1 and the visual interface apparatus 2. Thus, an interactive dialog can be established between the signal transmission and reception. Moreover, the response signal, RS, also can serve as a synchronization function to form an information handshaking process.

Accordingly, when the user takes and operates the operation apparatus 1 on the display panel 21 of the visual interface apparatus 2 (such as contacting or approaching the display panel 21), the coupling signal CS can be coupled to the operation apparatus 1 from the display surface S of the display panel 21 through the capacitive or inductive coupling and the coupling data can be extracted by the operations apparatus 1. For example, when the operation apparatus 1 is an access control unit, by moving the display surface of the visual interface apparatus 2 close to the operation apparatus 1, the operation apparatus 1 can receive the open-door or lock-door message transmitted by the visual interface apparatus 2, and thereby the lock can be removed or applied. When the visual interface apparatus 2 is a public display and the operation apparatus 1 is a cell phone or another personal apparatus, by approaching the display surface of the visual interface apparatus 2 with the operation apparatus 1, the message such as advertising message, promotion message, geographical information can be transmitted to the personal apparatus. Or, if the visual interface apparatus 2 is a cell phone and the operation apparatus 1 is a watch or ring-typed storage device worn on the user's hand, when the user contacting or approaching the display surface S of the visual interface apparatus 2, the coupling signal CS containing the phone book, short message or confidential data can be coupled to the watch or ring-typed storage device through the human body for storage, and thereby prevent the problems arise when the cell phone is lost or stolen and also the functions of the cell phone can be simplified.

Figure 4:
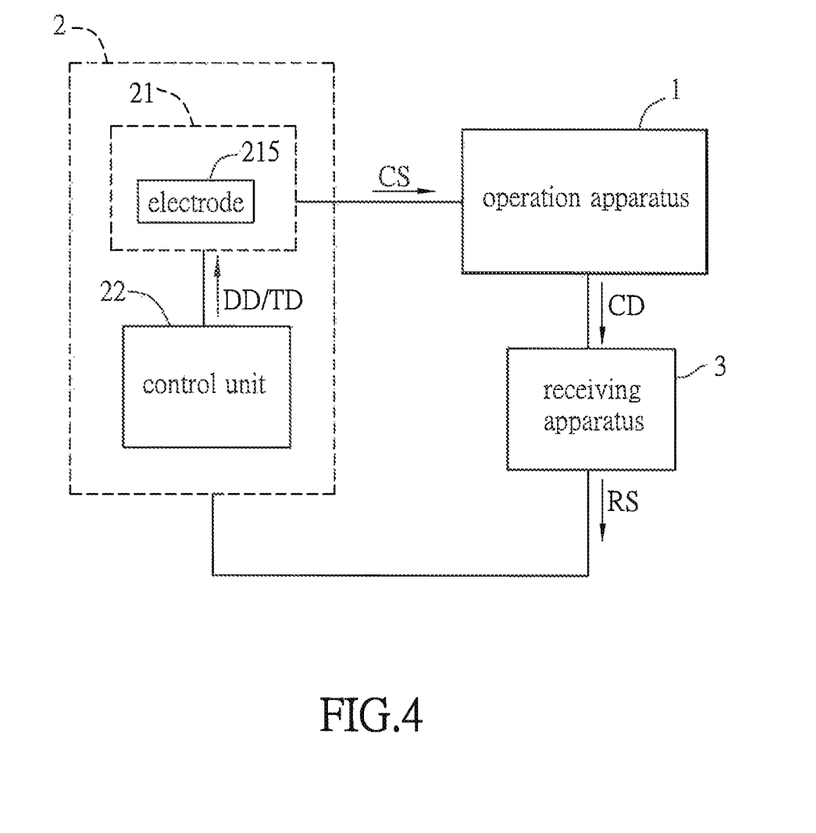
FIG. 4 is a schematic functional block diagram of a data transmission of another preferred embodiment of the invention.

FIG. 4 is a schematic functional block diagram of a data transmission of another preferred embodiment of the invention.

Different from the embodiment of FIG. 2, the data transmission system of this embodiment also include a receiving apparatus 3, and the coupling data CD obtained by the operation apparatus 1 is transmitted again to the visual interface apparatus 2 and/or the receiving apparatus 3 from the operation apparatus 1. Herein, the coupling data CD is transmitted to the receiving apparatus 3 through the operation apparatus 1 and the receiving apparatus 3 can obtain a receiving data according to the coupling data CD. Moreover, the receiving apparatus 3 also can generate a response signal RS according to the coupling data CD and transmit it to the visual interface apparatus 2.

For example, when the operation apparatus 1 is a user and the receiving apparatus 3 is a cell phone, the user, by one hand contacting the visual interface apparatus 2 and the other hand contacting the cell phone (receiving apparatus 3), can pass the coupling signal CS from one hand and the body to the other hand and the cell phone (that is the capacitive coupling of the signal by the human body), and thereby the data can be transmitted to the receiving apparatus 3 from the visual interface apparatus 2 through the user's body. In another application of this embodiment, the signal of the visual interface apparatus 2 serves as a carrier wave to modulate the bioelectrical signal of the user, and then the receiving apparatus 3 demodulates to obtain the physiological message (such as electrocardiogram, brainwave, body impedance or others) of the bioelectrical signal. In this embodiment, through an additional auxiliary electrode, the signal of the visual interface apparatus 2 can be guided to the particular portion of the body or the signal from the particular portion of body can be guided to the receiving apparatus 3. In other words, this transmission architecture can have totally different applications, which the transmission data TD of the visual interface apparatus 2 is adjusted to adapt the application scenario and the receiving apparatus 3 can decode and interpret the coupling signal CS accordingly. If the receiving apparatus 3 is a cell phone, in addition to the file or data transmission, the data such as the physiological information of the user (body) can be obtained by different extracting software (such as APP software). Besides, the cell phone can transmit the response signal RS back to the visual interface apparatus 2 to inform the visual interface apparatus 2 to achieve the message handshaking. To be noted, the above-mentioned application can be implemented by the same electronic apparatus. That is the embodiment where the coupling data CD is transmitted back to the visual interface apparatus 2, which is a cell phone in this case.

To be noted, it has been mentioned in the embodiment of FIG. 1 that the control unit 22 adds a label in the display data DD and/or adds another label in the transmission data TD so that the operation apparatus 1 can identify the display data DD and the transmission data TD according to the label and/or the another label. However, in this embodiment, the receiving apparatus 3 can identify the display data DD and the transmission data TD according to the label and/or the another label added by the control unit 22, and the desired transmission message also can be obtained likewise.

In summary, in the visual interface apparatus and the data transmission system of this invention, when the operation apparatus is operated on the display surface of the visual interface apparatus, the coupling signal including the transmission data is coupled to the operation apparatus from at least one electrode of the display panel, and the operation apparatus can receive the coupling data after receiving the coupling signal. Thereby, not only the visual interface apparatus can display images, but also transmit the transmission data such as data or files to another electronic apparatus. Therefore, it can be applied to various short range wireless communication situations, and the applications of the display apparatus can be extended.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A visual interface apparatus cooperating with an operation apparatus and having a display surface, the visual interface apparatus comprising:
a display panel including an array substrate and a display medium, wherein the array substrate includes a substrate and a display pixel array, the display pixel array is disposed on the substrate, the display pixel array includes a plurality of row electrodes, column electrodes and pixel electrodes for displaying images; and
a control unit transmits both a display data and a non-displayed transmission data dedicated to the operation apparatus to at least one of the row electrodes or at least one of the column electrodes of the display pixel array, wherein the display data for displaying images includes scan driving signals and data driving signals to drive the pixel electrode to display image, and the non-displayed transmission data dedicated to the operation apparatus is not for processing image signals but for carrying information to the operation apparatus,
wherein on the at least one of the row electrodes or at least one of the column electrodes of the display pixel array, the non-displayed transmission data dedicated to the operation apparatus and the display data for displaying images are arranged according to time-division multiplexing, frequency-division multiplexing, or code-division multiplexing, and
wherein when the operation apparatus is operated on the display surface, a coupling signal containing the display data and the non-displayed transmission data dedicated to the operation apparatus arranged according to time-division multiplexing, frequency-division multiplexing, or code-division multiplexing is wirelessly coupled to the operation apparatus from the at least one of the row electrodes or the at least one of the column electrodes of the display pixel array, and the operation apparatus receives the coupling signal.

2. The visual interface apparatus as recited in claim 1, wherein the display panel is a two-dimensional active array display panel, a two-dimensional passive array display panel, a two-dimensional dot array display panel or a one-dimensional dot array display panel.

3. The visual interface apparatus as recited in claim 1, wherein the display surface and the pixel array are located on the same side or opposite sides of the substrate.

4. The visual interface apparatus as recited in claim 1, wherein a content of the non-displayed transmission data and the coupling data includes a touch information, command information, identification information, trading information, file information, body physiological information or the size information of the operation apparatus.

5. The visual interface apparatus as recited in claim 1, wherein the coupling data is transmitted to the visual interface apparatus or a receiving apparatus through the operation apparatus.

6. The visual interface apparatus as recited in claim 5, wherein the receiving apparatus obtains a receiving data according to the coupling data.

7. The visual interface apparatus as recited in claim 5, wherein the operation apparatus or the receiving apparatus generates a response signal according to the coupling data and transmits the response signal to the visual interface apparatus.

8. The visual interface apparatus as recited in claim 1, wherein the control unit adds a label in at least one of the display data and the non-displayed transmission data for the operation apparatus to distinguish the non-displayed transmission data from the scan driving signals and the data driving signals, and the label contains at least a transmission label or at least a data label, and
wherein the operation apparatus identifies the display data and the non-displayed transmission data dedicated to the operation apparatus of the coupling signal according to the transmission label or the data label so as to extract the non-displayed transmission data dedicated to the operation apparatus from the coupling signal, and the transmission label marks different modulation manners of the non-displayed transmission data dedicated to the operation apparatus and the display data by means of different frequency, different amplitude or different phase, the data label marks the beginning position, ending position or data length of the display data or the non-displayed transmission data dedicated to the operation apparatus.

9. The visual interface apparatus as recited in claim 1, wherein on the at least one of the row electrodes or at least one of the column electrodes of the display pixel array:
in one scanning time, the transmission data dedicated to the operation apparatus is prior than the data signal for displaying images; or
the frequency of the transmission data dedicated to the operation apparatus is higher than the frequency of the data signal for displaying images; or
the non-displayed transmission data dedicated to the operation apparatus is superposed on the display data for displaying images or the transmission data dedicated to the operation apparatus is within the interval between the display data for displaying images.

10. A data transmission system, comprising:
an operation apparatus; and
a visual interface apparatus including a display surface, a display panel and a control unit, wherein the display panel includes an array substrate and a display medium, the array substrate includes a substrate and a display pixel array, the display pixel array is disposed on the substrate, the display pixel array includes a plurality of row electrodes, column electrodes and pixel electrodes for displaying images, the control unit transmits both a display data and a non-displayed transmission data dedicated to the operation apparatus to at least one of the row electrodes or at least one of the column electrodes of the display pixel array,
wherein the display data for displaying images includes scan driving signals and data driving signals to drive the pixel electrode to display image, and the non-displayed transmission data dedicated to the operation apparatus is not for processing image signals but for carrying information to the operation apparatus,
wherein on the at least one of the row electrodes or at least one of the column electrodes of the display pixel array, the non-displayed transmission data dedicated to the operation apparatus and the display data for displaying images are arranged according to time-division multiplexing, frequency-division multiplexing, or code-division multiplexing, and
wherein when the operation apparatus is operated on the display surface, a coupling signal containing the display data and the non-displayed transmission data dedicated to the operation apparatus arranged according to time-division multiplexing, frequency-division multiplexing, or code-division multiplexing is wirelessly coupled to the operation apparatus from the at least one of the row electrodes or the at least one of the column electrodes of the display pixel array, and the operation apparatus receives the coupling signal.

11. The data transmission system as recited in claim 10, wherein the display panel is a two-dimensional active array display panel, a two-dimensional passive array display panel, a two-dimensional dot array display panel or a one-dimensional dot array display panel.

12. The data transmission system as recited in claim 10, wherein the display surface and the pixel array are located on the same side or opposite sides of the substrate.

13. The data transmission system as recited in claim 10, wherein a content of the non-displayed transmission data and the coupling data includes a touch information, command information, identification information, trading information, file information, body physiological information or size information.

14. The data transmission system as recited in claim 10, further comprising:
   a receiving apparatus, wherein the coupling data is transmitted to the visual interface apparatus or the receiving apparatus through the operation apparatus.

15. The data transmission system as recited in claim 14, wherein the receiving apparatus obtains a receiving data according to the coupling data.

16. The data transmission system as recited in claim 14, wherein the operation apparatus or the receiving apparatus generates a response signal according to the coupling data and transmits the response signal to the visual interface apparatus.

17. The data transmission system as recited in claim 10, wherein the control unit adds a label in at least one of the display data and the non-displayed transmission data for the operation apparatus to distinguish the non-displayed transmission data from the scan driving signals and the data driving signals, and the label contains at least a transmission label or at least a data label, and
   wherein the operation apparatus identifies the display data and the non-displayed transmission data dedicated to the operation apparatus of the coupling signal according to the transmission label or the data label so as to extract the non-displayed transmission data dedicated to the operation apparatus from the coupling signal, and the transmission label marks different modulation manners of the non-displayed transmission data dedicated to the operation apparatus and the display data by means of different frequency, different amplitude or different phase, the data label marks the beginning position, ending position or data length of the display data or the non-displayed transmission data dedicated to the operation apparatus.

18. The data transmission system as recited in claim 10, wherein on the at least one of the row electrodes or at least one of the column electrodes of the display pixel array:
   in one scanning time, the transmission data dedicated to the operation apparatus is prior than the data signal for displaying images; or
   the frequency of the transmission data dedicated to the operation apparatus is higher than the frequency of the data signal for displaying images; or
   the non-displayed transmission data dedicated to the operation apparatus is superposed on the display data for displaying images or the transmission data dedicated to the operation apparatus is within the interval between the display data for displaying images.

* * * * *